United States Patent
Borgmeier et al.

(10) Patent No.: US 7,100,908 B2
(45) Date of Patent: Sep. 5, 2006

(54) SHOCK ABSORBER/PNEUMATIC SPRING STRUT

(75) Inventors: Olav Borgmeier, Hückeswagen (DE); Dirk Dresen, Leverkusen (DE)

(73) Assignee: Voss Automotive GmbH, Wipperfurth (DE)

( * ) Notice: Subject to any disclaimer, the term of this patent is extended or adjusted under 35 U.S.C. 154(b) by 28 days.

(21) Appl. No.: 10/933,709

(22) Filed: Sep. 3, 2004

(65) Prior Publication Data

US 2005/0061594 A1    Mar. 24, 2005

(30) Foreign Application Priority Data

Sep. 5, 2003    (DE) ................. 103 41 003

(51) Int. Cl.
F16F 9/342    (2006.01)
F16F 9/04    (2006.01)
(52) U.S. Cl. ................. 267/64.22; 267/64.24; 267/64.27; 267/122
(58) Field of Classification Search ............... 188/313, 188/314, 315; 267/64.19, 64.21, 64.22, 64.23, 267/64.24, 64.25, 64.27, 64.28, 122, 123, 267/64.11, 64.13, 64.15
See application file for complete search history.

(56) References Cited

U.S. PATENT DOCUMENTS

| 4,659,070 A | * | 4/1987 | Buma | 267/64.25 |
| 4,712,776 A | * | 12/1987 | Geno et al. | 267/64.21 |
| 4,993,694 A | * | 2/1991 | Gandiglio et al. | 267/64.24 |
| 5,669,597 A | * | 9/1997 | Rittstieg et al. | 267/64.21 |
| 6,286,820 B1 | * | 9/2001 | Raulf et al. | 267/64.21 |

FOREIGN PATENT DOCUMENTS

| DE | 1 869 264 | 3/1963 |
| DE | 44 03 897 A1 | 8/1995 |
| DE | 199 03 553 A1 | 9/2000 |
| DE | 199 40 198 C1 | 2/2001 |
| DE | 102 36 621 | 3/2004 |
| EP | 0 403 447 | 12/1990 |
| GB | 986327 | 3/1965 |

* cited by examiner

Primary Examiner—Thomas J. Williams
(74) Attorney, Agent, or Firm—Brinks Hofer Gilson & Lione

(57) ABSTRACT

The invention relates to a damper arrangement, in particular an air spring strut, comprising a shock absorber having an essentially cylindrical housing and an air spring with a working space which is under internal pressure, and comprising an additional volume which can be connected to the working space via a closable flow duct. It is proposed to enclose the additional volume by a hollow body which surrounds the shock absorber which can be fastened thereto and is formed from an outer cylinder and an inner cylinder, which is connected to the latter and, in particular, is arranged concentrically.

33 Claims, 3 Drawing Sheets

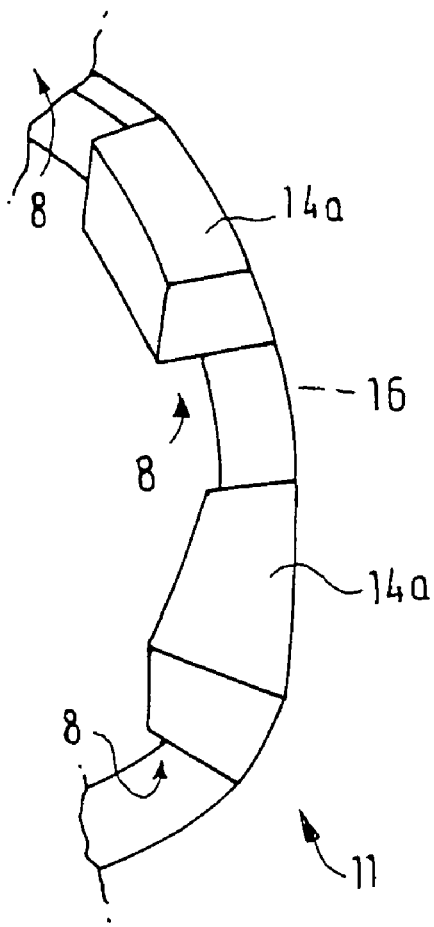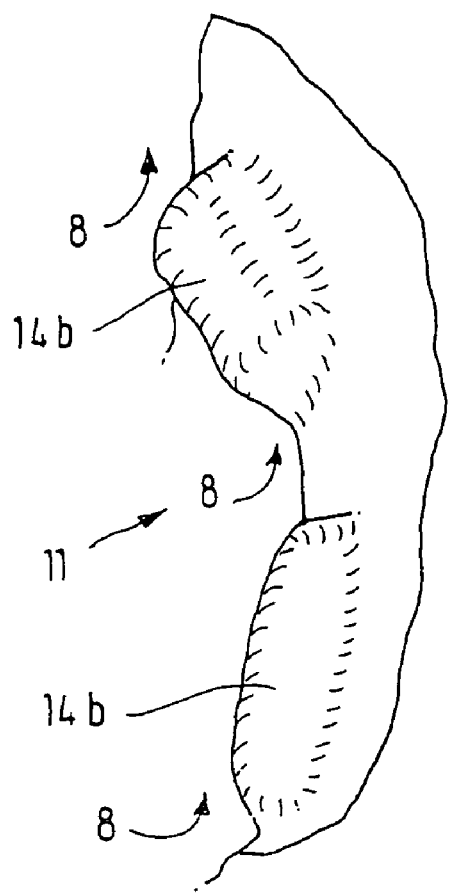

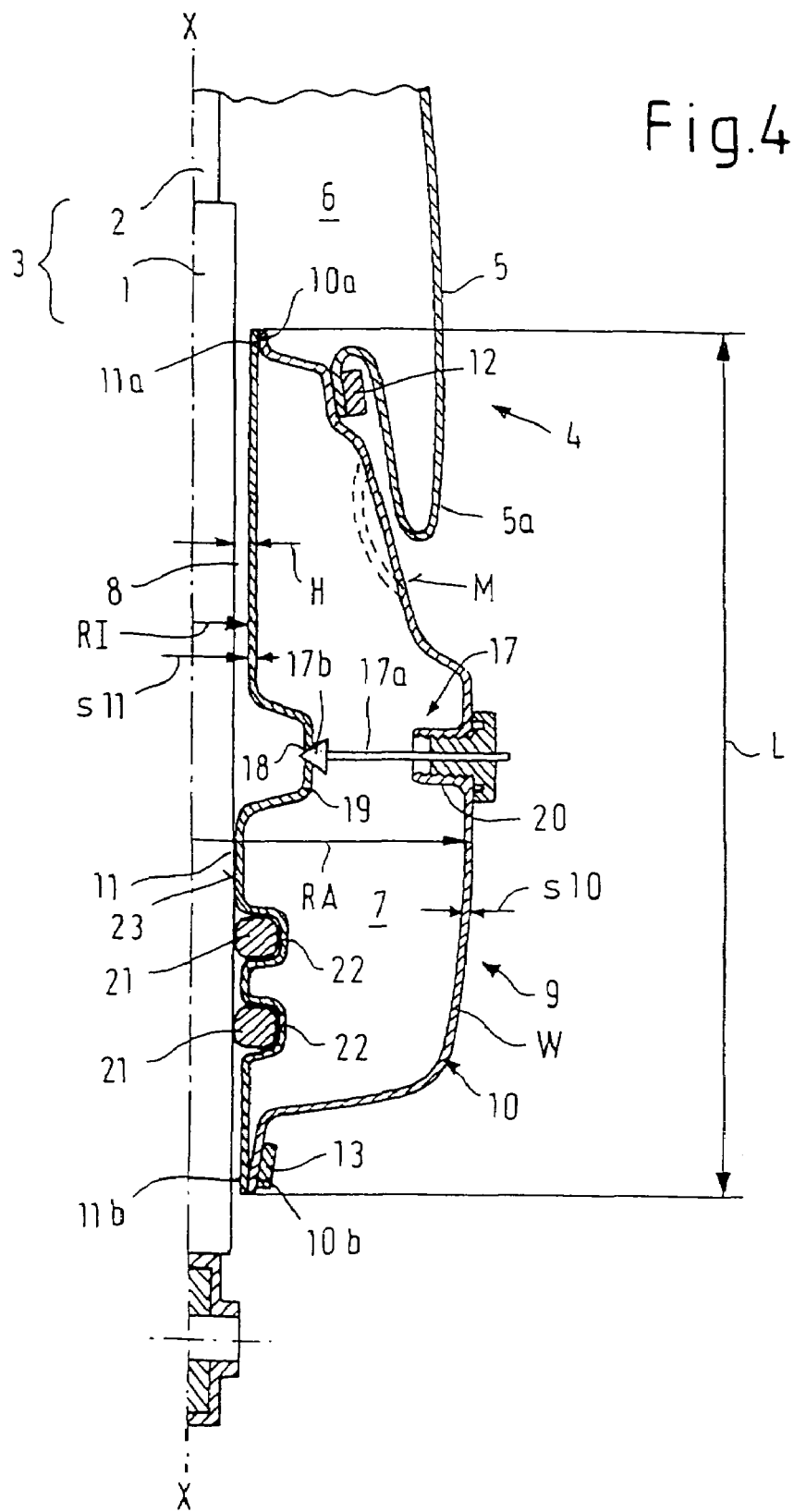

SHOCK ABSORBER/PNEUMATIC SPRING STRUT

CROSS-REFERENCE TO RELATED APPLICATION

This application claims priority to German patent application number 103 41 003.1, filed Sep. 5, 2003 which is currently pending.

BACKGROUND OF THE INVENTION

The present invention relates to a damper arrangement, in particular a pneumatic spring strut, comprising a shock absorber having an essentially cylindrical housing and an air spring with a working space which is under internal pressure, and comprising an additional volume which can be connected to the working space via a closable flow duct. Furthermore, the invention relates to a hollow body for use in this arrangement.

SUMMARY OF THE INVENTION

Air spring struts are used for absorbing shocks and vibrations in motor vehicles and characteristically comprise an air spring and a shock absorber connected in parallel. Thus, DE 199 03 553 C2 discloses an air spring strut, in which an inner guide of an air spring bellows is supported on a cylinder housing of a shock absorber and on the edge of a stop cup, which is connected to the cylinder housing and serves as a stop for a buffer which, when a limit value for the displacement of the piston rod of the shock absorber is exceeded, comes to bear against the cylinder housing. In this case, the inner guide is subjected to radial and axial forces at the attachment points of the air spring bellows. According to DE 199 03 553 C2, the inner guide is supported directly on the cylinder housing, this resulting in a stiff support. The stop cup, the deformations of which are not coupled to the support of the inner guide, can have a connecting duct to the working space of the air spring. The duct serves to equalize the pressure, but does not constitute a connectable additional volume for the air spring that enables the spring characteristics to be changed.

DE 199 40 198 C1 describes a method for controlling a system, in particular for motor vehicles. The system contains an air spring which encloses an air volume, and the system furthermore having a controllable shock absorber which is connected in parallel thereto, and also an additional volume to which the air volume of the air spring is connected via a controllable throttle. The known system therefore constitutes an arrangement of the type mentioned at the beginning. The method comprises the following method steps: 1) an overall damping of the system and a spring stiffness of the air spring are predetermined, 2) the throttling resistance of the throttle, via which the air volume of the air spring is connected to the additional volume, is set in such a manner that the air spring has the predetermined spring stiffness, 3) the magnitude of the damping which arises at the throttle, via which the air volume of the air spring is connected to the additional volume, is determined as a function of frequency and, 4) the controllable shock absorber is set in such a manner that the sum of the damping arising in the shock absorber and the damping arising between the air volume of the air spring and the additional volume corresponds to the greatest possible extent to the overall damping. DE 199 40 198 C1 describes the overall construction of the system in schematic form, but does not show any specific structural details.

The present invention is based on the object of providing a damper arrangement of the type mentioned at the beginning, which is distinguished by a low weight and a manner of production of little complexity.

This is achieved according to the invention by the additional volume being enclosed by a hollow body which surrounds the shock absorber and is formed from an outer cylinder and an inner cylinder which is connected to the latter and, in particular, is arranged concentrically.

The outer cylinder and/or the inner cylinder of a hollow body of this type can be produced in a manner which is of little complexity in terms of manufacturing by for example hydroforming, or by a hot drawing-in process by means of rolling metallic pipe lengths. DE 44 03 897 C1 describes a method, which can preferably be used for this, for the hot drawing-in of the ends of hollow work pieces by means of rolling, in which the work piece is made to rotate. The end of the workpiece to be machined is preheated to a preselected temperature and a pressing tool is applied stepwise, with, in the engagement region of the pressing tool, a specific heating of the work piece to the forming temperature taking place, with the heating limited to the engagement region. In a forming process of this type, the cylinders are formed only counter to the forces integral to the material and without internal dies or punches. This advantageously also permits the production of undercut geometries. A possible combination of fine machining by cutting together with the heat treatment and the shaping means that only a single chucking of the work piece is necessary, thereby resulting in a rapid and precise manufacturing process of little complexity. After the shaping process, the axial, in particular tubular, ends of the outer cylinder and of the inner cylinder can be connected to one another, for example frictionally and/or with an adhesive material joint, in order to form the hollow body. The hollow body can then be fastened to the housing of the shock absorber with a form fit and/or frictionally.

Further advantageous refinement features of the invention are contained in the subclaims and in the following description.

BRIEF DESCRIPTION OF THE DRAWINGS

The invention will be explained in greater detail below with reference to two preferred exemplary embodiments, in which FIG. 2 shows a perspective illustration of a detail, designed as an alternative to FIG. 1, of a strut arrangement according to the invention, in the region of a flow duct, FIG. 3 shows an illustration corresponding to FIG. 2 with a further alternative illustration of a detail, FIG. 4 shows an axial half section through a second design of a shock absorber/pneumatic spring strut arrangement according to the invention.

In the various figures of the drawing, identical and similar parts are also provided with the same reference numbers, and so they are generally also only described once in each case.

DETAILED DESCRIPTION OF THE INVENTION

Figure 1:
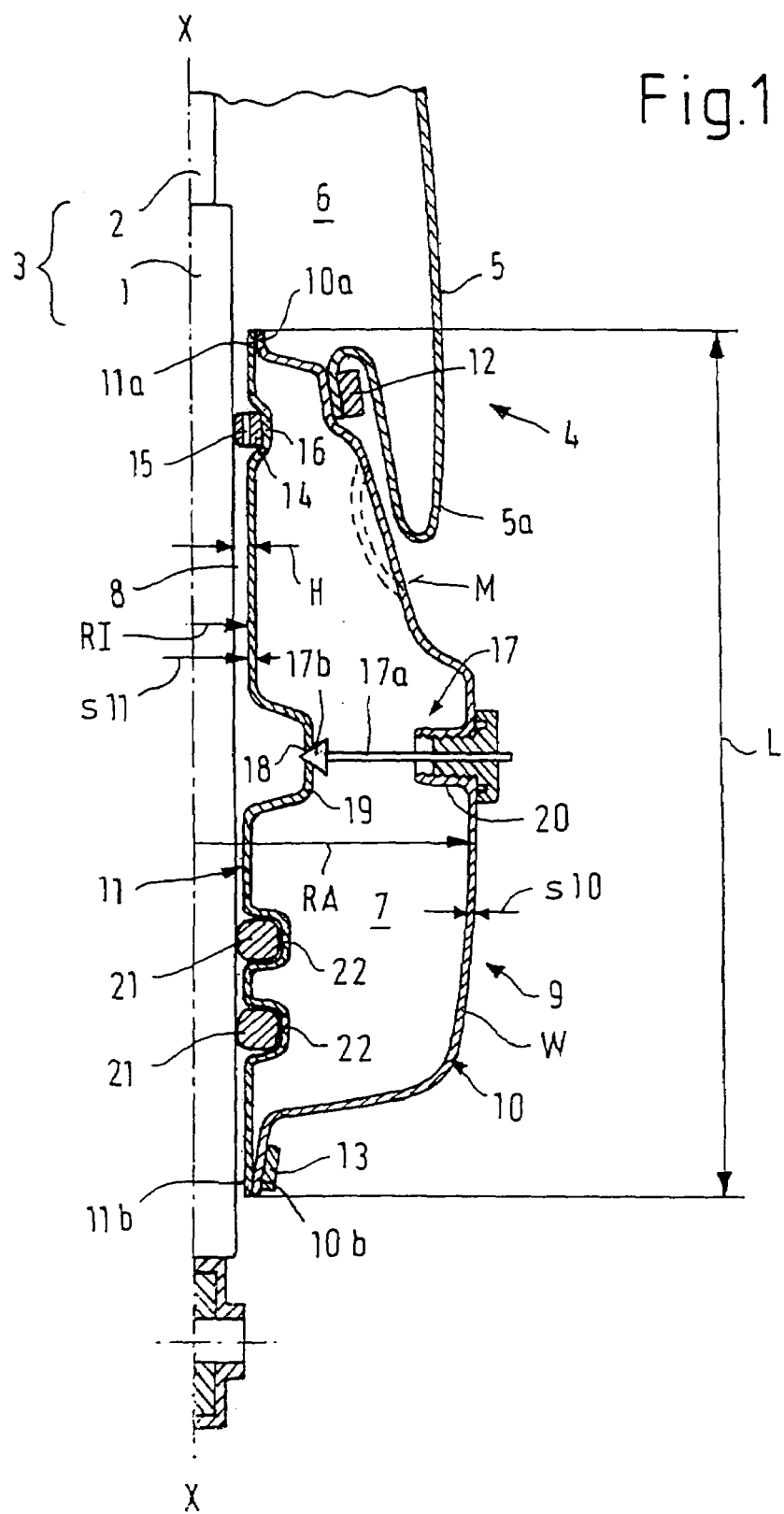
FIG. 1 shows an axial half section through a first design of a shock absorber/pneumatic spring strut according to the invention.

FIG. 1 shows a shock absorber/pneumatic spring strut arrangement according to the invention, which can be, in particular, an air spring leg for a motor vehicle, comprises a strut 3 having an essentially cylindrical housing 1 and a piston rod 2, and an air spring 4 with a flexible wall which is designed as a rolling bellows 5 consisting of an elastomer and bounds a working space 6 which is under internal pressure. Furthermore, the strut arrangement comprises an additional volume 7 which can be connected to the working space 6 via a closable flow duct 8.

The additional volume 7 is enclosed by a hollow body 9 which surrounds the strut 3 and the wall W which, as illustrated, is completely formed from an outer cylinder 10 and an inner cylinder 11 which is connected to the latter and is arranged concentrically about the longitudinal axis X—X.

As already mentioned, the outer cylinder 10 and/or the inner cylinder 11 of the hollow body 9 can preferably be formed by hydroforming or by a hot drawing-in process by means of rolling metallic pipe lengths. This also makes it advantageously possible to variably adjust the size of the additional volume 7 within wide limits during the manufacturing process by appropriate formation of the extent of the radius RI of the inner cylinder 11, and of the radius RA of the outer cylinder 10 over the length L of the hollow body 9. In this case, in order to permit this manufacturing process and in order to obtain an advantageous mass/power ratio, the outer cylinder 10, which consists, in particular, of metal and/or the inner cylinder 11, which likewise consists, in particular of metal, can have a wall thickness s10, s11 respectively of 0.5 mm to 4.8 mm as is characteristic of thin sheet or light plate metal.

The axial, in particular tubular ends 10a, 10b of the outer cylinder 10 and the ends 11a, 11b of the inner cylinder 11, can be connected to one another, in particular frictionally and/or with an adhesive material joint, in order to form the hollow body 9, it being possible for the radii RI, RA of the cylinders 10, 11 to be set to such values that a direct connection of the ends 10a to 11a, and 10b to 11b is possible.

In order to fasten the hollow body 9, a form-fitting and/or frictional mounting of the adjacent or connected ends 10a/11a, 10b/11b and/or of the outer casing M of the hollow body 9 directly or indirectly on the housing 1 of the strut 3 can be provided, for example by means of the crimping rings 12, 13 illustrated in FIG. 1. In this case, one crimping ring 12 advantageously serves at the same time to fasten the rolling bellows 5 of the air spring 4 at one end to the casing M of the outer cylinder 10 of the hollow body 9.

In this arrangement, the working space 6 of the air spring 4 surrounds the strut 3. The hollow body 9 is arranged in the axial direction X—X of the strut 3 below the working space 6 of the air spring 4. In this case, the casing M of the outer cylinder 10 of the hollow body 9 forms a sliding surface, in particular running conically, for a rolling fold 5a of the rolling bellows 5. The pressure which acts in this case on the thin-walled sliding surface of the casing M by means of the rolling fold 5a, is compensated here by the internal pressure of the additional volume 7, so that deformation of the wall W, as is indicated in FIG. 1 at the appropriate point by means of a dashed line, cannot occur.

The flow duct 8 of the damping arrangement according to the invention, is advantageously formed by an annular gap between the housing 1 of the strut 3 and the inner cylinder 11 of the hollow body 9. For this purpose, the inner cylinder 11 is enlarged in its radius RI by a gap H of the flow duct 8. This dispenses with the necessity of using an additional component for this purpose. In order to stabilize the flow duct 8, provision may be made here for at least one spacer 14 to be arranged in the annular gap between the housing 1 of the strut 3 and the inner cylinder 11 of the hollow body 9. The spacer 14 can be, in particular, of annular design and, as illustrated, can have air passage openings 15 running in the axial direction X—X. In this case, the inner cylinder 11 of the hollow body 9 can have a radially outwardly directed, groove-like wall recess 16 in order to form a mount for the spacer 14.

In order to open and close the flow duct 8, so as to design the additional volume 7 in a manner such that it can be connected or disconnected, an overflow valve 17 may be provided. In an advantageous development in this case, the inner cylinder 11 of the hollow body 9 may have a valve seat 18 for this overflow valve 17, it being possible for a radially outwardly directed curvature 19 to be formed on the inner cylinder 11 in order to form the valve seat 18.

The overflow valve 17 may have a tappet 17a on which a valve cone 17b or a similar closure body sits. The tappet 17a may reach through the hollow body 9, in particular in the radial direction transversely with respect to the longitudinal axis X—X, and may be alternatively mounted to the outer cylinder 10 of the hollow body 9. In the region through which the tappet 17a reaches, in particular through curvature 19, the cross section of the hollow body 9 may advantageously be designed to be smaller than in other regions of the hollow body 9. For the mounting of the tappet 17a, the outer cylinder 11 of the hollow body 9 may have a receiving opening (not referred to specifically) which is surrounded in particular by a wall section 20 of the outer cylinder 10. This section is provided with a thread and is directed radially inward.

In a region outside the flow duct 8, the inner cylinder 11 may bear directly against the housing 1 of the strut 3. In this case, it is advantageous if the inner cylinder 11 of the hollow body 9 has at least one radially outwardly directed groove-like corrugation 22, in order to form at least one holder, in the case illustrated there are two, for a circumferential seal 21 or a plurality of circumferential seals 21.

The invention is not confined to the exemplary embodiment illustrated in FIG. 1, but rather encompasses all of the embodiments of equivalent effect within the meaning of the invention. It is thus possible, for example, as FIG. 2 shows, to provide, instead of a single annular spacer 14, a plurality of segmented spacers 14a which then do not need to have any air passage openings 15. The fastening of the hollow body 9 may also be undertaken in a different manner than illustrated in FIG. 1. For example, by means of a screw connection. The invention also includes a closure of the hollow body 9 on the end side in the axial direction X—X, for which the two cylinders 10, 11 are not connected directly at their ends 10a, 10b, 11a, 11b, as preferred on account of the associated advantages in terms of the manufacturing process, but rather indirectly, for example via annular additional elements.

Another possibility also consists in providing, instead of spacers 14, 14a in the region of the flow duct 8, bead-like, radially inwardly curved regions 14b on the inner cylinder 11, as FIG. 3 shows. In this case, it is also unnecessary to provide a wall recess 16 on the inner cylinder 11. The inwardly curved regions 14b can be designed with respect to their dimensions in such a manner that they bear with play or in a manner free from play against the housing 1 of the shock absorber 3 or that they form a press fit together with the housing 1. At least two, but preferably three or more, diametrically opposite curved regions 14b may be provided.

FIG. 4 shows, as already mentioned, a further design of the arrangement according to the invention. If, in a region below the flow duct 8 that is referred to in this figure by the reference number 23, a press fit is provided between the inner cylinder 11 of the hollow body and the housing 1 of the shock absorber 3, spacers 14, 14a may even be entirely dispensed with. In this case, the press fit may be formed, in particular, by a circumferentially extending radially inwardly directed constriction 23 of the inner cylinder 11.

The described design of the hollow body 9 and its use for a shock absorber/pneumatic spring strut arrangement of the type described at the beginning have an independent inventive significance.

Furthermore, the invention is also not yet confined to the combinations of features defined in appended claim 1, but can also be defined by any other desired combination of particular features of all disclosed individual features. This means that, in principle, virtually any individual feature of the claims can be omitted or replaced by at least one individual feature disclosed elsewhere in this description. To this extent, the claims are to be understood merely as a first attempt at formulating an invention.

The invention claimed is:

1. A shock absorber/pneumatic spring strut comprising an essentially cylindrical housing, an air spring with a working space which is under internal pressure, an additional volume which can be connected to the working space via a closable flow duct, wherein the additional volume is enclosed by a hollow body which radially surrounds the housing and is formed from an outer cylinder and a concentrically arranged and connected inner cylinder and the flow duct is formed within an annular gap between the housing and the inner cylinder of the hollow body.

2. The strut as claimed in claim 1, wherein the outer cylinder or the inner cylinder of the hollow body is formed by hydroforming or by a hot drawing-in process by means of rolling metallic pipe lengths.

3. The strut as claimed in claim 1, wherein the axial ends of the outer cylinder and of the inner cylinder are connected to one another frictionally or with an adhesive material in order to form the hollow body.

4. The strut as claimed in claim 1, wherein the hollow body is fastened to the housing of the strut with a form fit or press-fit.

5. The strut as claimed in claim 1, wherein the working space of the air spring surrounds the housing, and wherein the hollow body is arranged in the axial direction of the housing below the working space of the air spring.

6. The strut as claimed in claim 1, wherein the air spring has a flexible wall in the form of a rolling bellows and bounds the working space which is under internal pressure, the rolling bellows being fastened at one end thereof to the outer cylinder of the hollow body.

7. The strut as claimed in claim 1, wherein the outer cylinder of the hollow body forms a sliding surface, in particular running conically, for a rolling fold of the rolling bellows.

8. The strut as claimed in claim 1, wherein the outer cylinder or the inner cylinder has a wall thickness of between 0.5 mm and 4.8 mm.

9. The strut as claimed in claim 1, wherein a press fit is formed in a region below the flow duct between the housing of the shock absorber and the inner cylinder of the hollow body.

10. The strut as claimed in claim 1, wherein at least one spacer is arranged in the flow duct between the housing and the inner cylinder of the hollow body.

11. The strut as claimed in claim 10, wherein the spacer is of annular design and has air passage openings running in the axial direction.

12. The strut as claimed in claim 10, wherein a plurality of the spacers designed as ring segments are arranged in the flow duct between the housing and the inner cylinder of the hollow body.

13. The strut as claimed in claim 10, wherein the inner cylinder of the hollow body has at least one radially outwardly directed, wall recess to form at least one mount for the spacer.

14. The strut as claimed in claim 1, wherein at least two diametrically opposite, but preferably three or more radially inwardly curved bead shaped regions are formed on the inner cylinder of the hollow body in the region of the flow duct.

15. The strut as claimed in claim 1, wherein the inner cylinder of the hollow body has a valve seat for an overflow valve for closing the flow duct.

16. The strut as claimed in claim 15, wherein the inner cylinder of the hollow body has a radially outwardly directed curvature in order to form the valve seat.

17. The strut as claimed in claim 15, wherein the overflow valve has a tappet which reaches through the hollow body, in particular in the radial direction, and which is mounted in the outer cylinder of the hollow body.

18. The strut as claimed in claim 17, wherein the outer cylinder of the hollow body has, for the mounting of the overflow valve, and the tappet, a receiving opening surrounded by a radially inwardly directed wall section of the outer cylinder.

19. The strut as claimed in claim 1, wherein the inner cylinder of the hollow body has at least one radially outwardly directed grooved corrugation in order to form at least one holder for a circumferential seal.

20. A hollow body for the enclosure of an additional volume of air for a shock absorber/pneumatic spring strut of the type having an air spring portion and, a damper arrangement including a shock absorber having an essentially cylindrical housing, and the air spring including a working space under internal pressure comprising:

the hollow body being connected to the working space via a closable flow duct, wherein the hollow body includes an outer cylinder concentrically arranged and connected with an inner cylinder and defining a wall, the inner cylinder being adapted for surrounding the housing of the shock absorber and the flow duct is formed within an annular gap between the housing and the inner cylinder of the hollow body.

21. The hollow body as claimed in claim 20, wherein the wall comprises a part of the air spring.

22. The hollow body as claimed in claim 20, wherein the outer cylinder or the inner cylinder is formed by hydroforming or by a hot drawing-in process by means of rolling metallic pipe lengths.

23. The hollow body as claimed in claim 20, wherein the axial ends of the outer cylinder and of the inner cylinder are connected to one another frictionally or with an adhesive material joint.

24. The hollow body as claimed in claim 20, wherein the outer cylinder can be connected at one end to a rolling bellows of the air spring, the rolling bellows being formed by a flexible wall of the air spring.

25. The hollow body as claimed in claim 24, wherein the outer cylinder forms a sliding surface, in particular running conically, for a rolling fold of the rolling bellows.

26. The hollow body as claimed in claim 20, wherein the inner cylinder has at least one radially outwardly directed, wall recess in order to form at least one mount for one or more spacers arranged in the flow duct between the housing of the shock absorber and the inner cylinder.

27. The hollow body as claimed in claim 20, wherein at least two diametrically opposite, radially inwardly curved bead shaped regions are formed on the inner cylinder.

28. The hollow body as claimed in claim 27, wherein three or more bead-like, radially inwardly curved regions are formed on the inner cylinder in the region of the flow duct.

29. The hollow body as claimed in claim 20, wherein the inner cylinder has a valve seat for an overflow valve for closing the flow duct.

30. The hollow body as claimed in claim 20, wherein the inner cylinder has a radially outwardly directed curvature in order to form the valve seat.

31. The hollow body as claimed in claim 20, wherein the outer cylinder has, for the mounting of an overflow valve, in particular a tappet of an overflow valve, a receiving opening which is preferably surrounded by a radially inwardly directed wall section of the outer cylinder.

32. The hollow body as claimed in claim 20, wherein the inner cylinder has at least one radially outwardly directed, grooved corrugation in order to form at least one holder for a circumferential seal.

33. The hollow body as claimed in claim 20, wherein the outer cylinder or the inner cylinder has a wall thickness of 0.5 mm and 4.8 mm.

* * * * *